Patented May 1, 1951

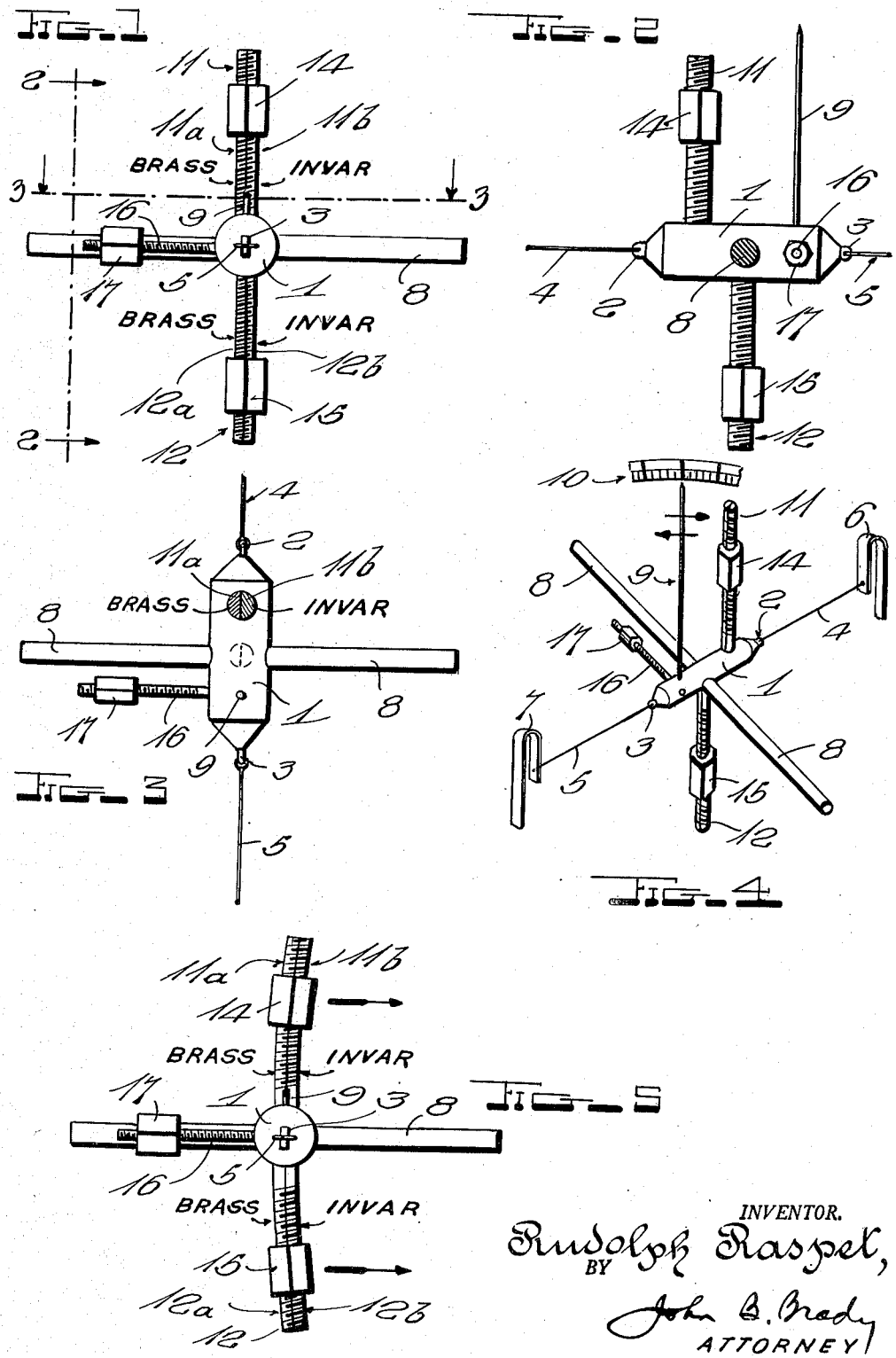

2,550,719

UNITED STATES PATENT OFFICE 2,550,719

TEMPERATURE COMPENSATION MEANS FOR MAGNETIC FIELD BALANCES

Rudolph Raspet, Baltimore, Md.

Application October 14, 1947, Serial No. 779,828

7 Claims. (Cl. 175—183)

My invention relates broadly to magnetometers and more particularly to means for improving the efficiency and accuracy of operation of magnetometers.

One of the objects of my invention is to provide a construction of moving element for a magnetometer having means for compensating for temperature changes for maintaining the accuracy of operation of the magnetometer over wide temperature ranges.

Another object of my invention is to provide a construction of temperature compensation means for the magnetic moving element of a magnetometer in which adjustable weights associated with the moving system of the magnetometer are shifted or displaced in accordance with the variations in temperature conditions for shifting the effective center of gravity of the balance system to compensate for the effect of temperature on the magnetic field balance.

Another object of my invention is to provide a construction of statically balanced moving element for a magnetometer which includes adjustable weight members operative over supporting members of composite and differing coefficients of temperature for efficiently controlling the position of the weights in accordance with the effect of temperature on the magnetic field balance.

Still another object of my invention is to provide a construction of angularly adjustable magnetic indicator for magnetometers, including a pair of radially extending arms, each constructed of composite materials of differing temperature coefficients and supporting adjustable weights which are adapted to be shifted in position in proportion to changes in temperature for developing compensating forces proportional to the effect of temperature on the magnetic field balance.

Other and further objects of my invention reside in the precision arrangement of counterbalancing means for the rotative element of magnetometers for changing the mechanical balancing coupling of the rotative element proportionally to the effect of temperature on the magnetic field balance, as set forth more fully in the specification hereafter following by reference to the accompanying drawing, in which:

Figure 1 is an end elevational view of the angularly shiftable element of the magnetometer embodying my invention; Fig. 2 is a sectional view taken substantially on line 2—2 of Fig. 1 and showing in elevation the angularly adjustable elements illustrated in Fig. 1; Fig. 3 is a transverse sectional view taken substantially on line 3—3 of Fig. 1; Fig. 4 is a perspective view of the angularly shiftable element in suspended position for operation and illustrating in perspective the temperature compensation means associated therewith; and Fig. 5 is a theoretical view illustrating on a somewhat exaggerated scale and displacement of the adjusting weights of the temperature compensation means of the angularly adjustable element of the magnetometer proportional to changes in temperature for compensating for the effect of temperature on the magnetic field balance.

The structure of magnetic field balance of my invention has been developed for securing a high degree of precision in the measurement of magnetic fields and in particular those magnetic fields related to ore bodies, geological bodies and structures, crystalline basements, and other sources of magnetic anomalies. In a magnetometer the effect of temperature on a magnetic field balance is to change the magnetic moment of the balance system, the change of moment being opposite to the change of temperature. Compensation of such a system consists in providing means whereby a change in temperature will shift part of the mass of the balance system to compensate for the change in magnetic moment.

Referring to the drawings in detail, reference character 1 designates a hub member of cylindrical shape having eyelets 2 and 3 at opposite ends thereof through which suspension threads 4 and 5 extend for elastically suspending the hub member 1 between the yieldable supports 6 and 7. The hub 1 serves as a support for the bar magnet 8 which constitutes the indicating means for the magnetometer and which rotates with respect to the external magnetic field to be measured. The cylindrical hub 1 carries an indicator 9 which operates over a calibrated scale represented at 10 for providing the readings obtained by the location of the magnetometer in proximity to the ore bodies, geological bodies and structure, crystalline basements, and other sources of magnetic anomalies under investigation.

The cylindrical hub 1 has a pair of radially extending temperature variation members designated generally at 11 and 12. The temperature variation members 11 and 12 are formed of composite material represented at 11a and 11b and at 12a and 12b. The temperature variation material has different temperature coefficients, that is, the material 11a consists of brass with a normal metallic thermal coefficient, while the material 11b consists of Invar which has a thermal coefficient of nearly zero. Similarly, the material 12a consists of brass, and the material 12b, consists of Invar. It will be observed that the position of the brass 11a of the member 11 is directly opposite the position of the brass 12a of the member 12. Correspondingly, the Invar material 11b of the member 11 is directly opposite the position of the Invar material 12b of the member 12. The temperature variation members 11 and 12 extend radially from hub member 1 perpendicular to bar magnet 8. The adjustment of the weights 14 and 15 on the temperature variation members serves to adjust the sensitivity of the balance system. The temperature variation members 11 and 12 are each screw-threaded for receiving the adjustable screw-threaded weights 14 and 15 which may be shifted for appropriately shifting the effective center of gravity of the balance system.

A balance device is also associated with the cylindrical hub 1 in the form of a screw-threaded member 16 carrying the screw-threaded adjustable counterweight 17. The screw-threaded member 16 extends radially from the cylinder hub 1 and in spaced relation to the bar magnet 8 and parallel thereto. The weight 17 may be revolved to adjust the weight toward or away from the center of rotation of the angularly adjustable system. Now, if the temperature of the system rises the magnet 8 becomes weaker and the system tends to deflect counterclockwise, assuming the field to be directed downward. To compensate for this effect some of the mass of the system must be shifted to the right in order to increase the clockwise torque. According to the present invention this is accomplished by mounting either the upper or the lower sensitivity weight 14—15 or both of them on the bimetallic screws 11—12 so that with a rise in temperature the bending of the screws 11—12 shift both of the weights 14—15 to the right. The effective compensation can be adjusted without changing the sensitivity of the system by moving both of the weights away from or toward the axis of rotation of the system by equal amounts.

I have shown in the theoretical view in Fig. 5 the effect of temperature change on the temperature variation members 11 and 12. It will be observed that the expansion of the brass 11a and 12a, the Invar remaining essentially unchanged, tends to throw the weights 14 and 15 to the right, thereby compensating for the weakening of the magnetic system due to rise of temperature. Correspondingly, a decrease in temperature results in the contraction of the brass 11a and 12a, moving the weights 14 and 16 to the left according to the gain in magnetism as the temperature of the system falls. Precision counterbalance of the moving system is controlled by adjustment of weight 17 on screw-threaded member 16. Individual adjustment of screw-threaded weights 14 and 15 on the screw threads of temperature variation members 11 and 12 may be made for effectively controlling sensitivity of the moving system.

The structure of my invention has proven highly efficient and accurate in operation, and while I have described one of the preferred embodiments of my invention, I realize that modifications may be made in the construction and arrangement of parts, and I desire that it be understood that no limitations upon my invention are intended other than may be imposed by the scope of the appended claims.

What I claim as new and desire to secure by Letters Patent of the United States is as follows:

1. A statically balanced magnetic system comprising a rotatably suspended hub member, a bar magnet extending diametrically through said hub member, a pair of radially extending temperature variation members projecting from said hub member at spaced positions along the length of said hub member in radial planes at substantially 90° to the plane of said bar magnet, each of said temperature variation members being compositely formed by coextensive portions of different temperature coefficients, said temperature variation members having their coextensive portions screw-threaded, and adjustable weights carried by said members and engaging the screw threads on the coextensive portions thereof.

2. A statically balanced magnetic system comprising a rotatably suspended hub member, a bar magnet extending diametrically through said hub member, temperature compensation means carried by said hub member for changing the torsional balance of said hub member proportional to changes in temperature said temperature compensation means comprising screw-threaded rods extending radially from said hub member in planes substantially normal to the plane of said bar magnet and displaced longitudinally along said hub member, said rods being compositely formed by a pair of coextensive portions each having different temperature coefficients of variation and internally screw threaded adjustable weights engaging each of said screw threaded rods and controllable in position with respect to the center of said hub member by the expansion and contraction of said pair of coextensive portions, and counterbalance means extending radially from said hub member in a plane intermediate the planes of said temperature compensation means.

3. A statically balanced magnetic system comprising a rotatably suspended hub member, a bar magnet extending diametrically through said hub member, temperature compensation means extending radially from said hub member in a radial plane displaced substantially 90° with respect to the plane of said bar magnet, said temperature compensation means comprising a pair of semicylindrical coextensive rods of differing temperature coefficients of variation having their diametrical portions lying in abutting contact with each other and adjustable weights carried by said temperature compensation means and operative to control the torsional balance of said hub member proportional to change in temperature.

4. A statically balanced magnetic system comprising a rotatably suspended hub member, a bar magnet extending diametrically through said hub member, temperature compensation means extending radially from said hub member in planes substantially normal to the plane of said bar magnet with one of said temperature compensation means transversely aligned with said bar magnet and the other of said temperature compensation means transversely spaced therefrom, said temperature compensation means each consisting of pairs of coextensive rods of differing temperature coefficients of variation having adjustable weights secured thereto, said rods being bendable according to effects of temperature thereon, and counterbalance means extending from said hub member in a radial plane intermediate the radial plane of said temperature compensation means and in transverse alignment with said bar magnet.

5. A statically balanced magnetic system comprising a rotatably suspended cylindrical hub member of substantially uniform section, a bar magnet extending diametrically through said hub member, and temperature compensation means connected with said hub member comprising a pair of radially extending coacting coextensive members of differing temperature coefficients screw threaded for receiving adjustable weights thereon and projecting in radial planes displaced approximately 90° with respect to the plane of said bar magnet, said members being bendable according to conditions of temperature to change the coupling relation of said weights and said rotatably suspended hub member in proportion to changes in temperature.

6. A statically balanced magnetic system comprising a rotatably suspended cylindrical hub member, a bar magnet extending diametrically through said hub member, temperature compensation means connected with said hub member comprising a pair of radially extending coacting coextensive members of differing temperature coefficients projecting in spaced radial planes substantially normal to the plane of said bar magnet, said radially extending coextensive coacting members each being screw threaded and adjustable weights engaged on each of said screw-threaded coacting members, said coacting members being bendable according to conditions of temperature and operating to change the coupling relation of said weights and said rotatably suspended hub member in proportion to changes in temperature, and counterbalance means associated with said hub member.

7. A magnetic system comprising a rotatably suspended hub member, a bar magnet extending through said hub member, temperature compensation means carried by opposite sides of said hub member extending in a direction normal to the direction of said bar magnet, said temperature compensation means consisting of pairs of coextensive rods each of differing temperature coefficient of variation and extending side by side from the surface of said hub member to the extremities of the said pairs of coextensive rods, and adjustable weights movable to selected positions along said pairs of coextensive rods, the rods of similar temperature coefficient of variation being coplanar on opposite sides of said hub member, said pairs of rods with the adjustable weights thereon being bendable according to conditions of temperature for changing the coupling relation of said weights in proportion to changes in temperature for automatically balancing the position of said rotatably suspended hub member with respect to a coacting magnetic field.

RUDOLPH RASPET.

REFERENCES CITED

The following references are of record in the file of this patent:

UNITED STATES PATENTS

| Number | Name | Date |
| --- | --- | --- |
| 1,909,619 | Herrick | May 16, 1933 |
| 1,943,850 | Truman | Jan. 16, 1934 |
| 2,010,245 | Roux | Aug. 6, 1935 |

FOREIGN PATENTS

| Number | Country | Date |
| --- | --- | --- |
| 448,647 | Great Britain | June 12, 1936 |